Jan. 6, 1970     J. F. HOLMES     3,487,484
TUNED FLOATING BODIES
Filed Sept. 5, 1967     2 Sheets-Sheet 1
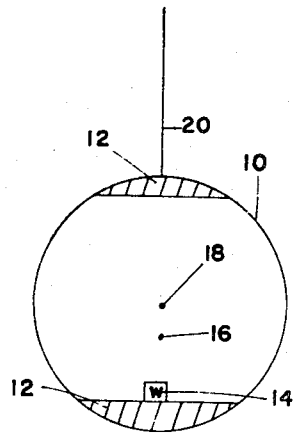
FIG. 1
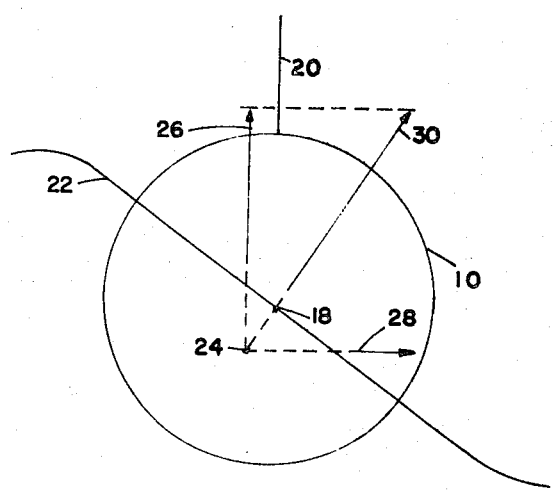
FIG. 2
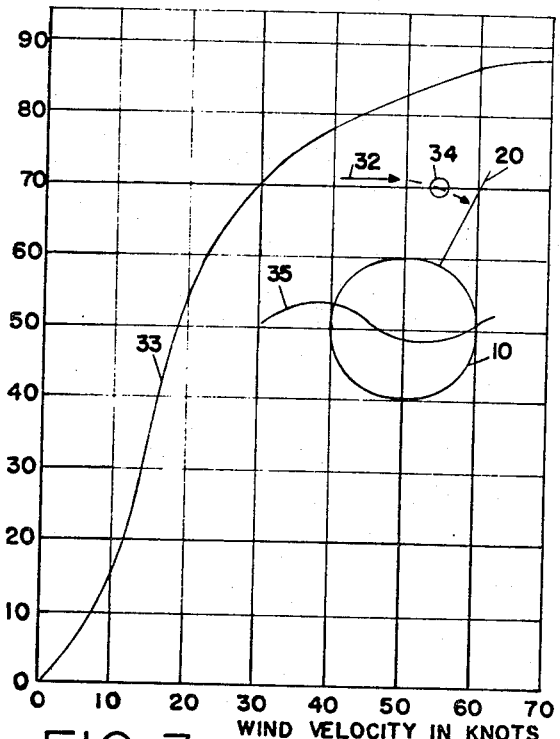
FIG. 3   WIND VELOCITY IN KNOTS
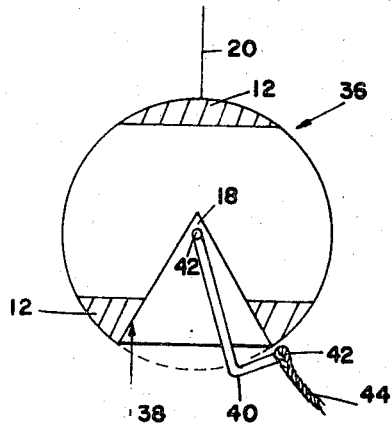
FIG. 4
INVENTOR
JOHN F. HOLMES,
BY
ATTORNEY

INVENTOR
JOHN F. HOLMES
ATTORNEY

United States Patent Office 3,487,484
Patented Jan. 6, 1970

3,487,484
TUNED FLOATING BODIES
John F. Holmes, Andover, Mass., assignor to Sanders Associates, Inc., Nashua, N.H., a corporation of Delaware
Filed Sept. 5, 1967, Ser. No. 665,464
Int. Cl. B63b *39/00*
U.S. Cl. 9—8        6 Claims

ABSTRACT OF THE DISCLOSURE

The invention disclosed herein relates to floating bodies and more particularly to a new and novel spherical body which is mechanically tuned such that it is decoupled from the motion of ocean waves. A tuning weight is disposed at the bottom of the body in order to provide a righting moment of a predetermined force.

BACKGROUND OF THE INVENTION

Field of the invention

The present invention pertains to floating bodies and more particularly to spherical bodies having mechanical characteristics such that wave energy is prevented from imparting oscillatory motions to the body.

DESCRIPTION OF THE PRIOR ART

A satisfactory means of decoupling a boat, buoy, research station, or the like from the motion of the ocean waves has been sought for many years. Modern ships have used surge tanks, controllable underwater fins and gyroscopes to control oscillatory motion arising when wave energy is imparted to the ship. Present buoys generally have no special means of motion control, and those few in which motion control has been attempted have incorporated one of many types of drag techniques to dissipate the energy imparted to the buoy by the ocean waves. Drag techniques such as that described in U.S. Patent No. 3,191,202 which issued to E. H. Handler on June 23, 1965 serve to reduce but do not eliminate oscillatory motions of the buoy resulting from wave motion. Buoy motion is a particularly difficult problem in buoys which are instrumented for measuring wave and wind conditions. The instrumentation measures the buoy motion in addition to the motion of the waves and wind and must be electronically filtered from the instrumentation output before the data is usable. Buoy motion is particularly difficult to filter due to the fact that the frequency of the motion is dependent upon both the amplitude and direction of the motion. Large floating bodies such as off-shore drilling platforms are also hampered by oscillatory motion resulting from energy imparted by the ocean swell. These oscillations may result in the breakage and loss of very expensive drilling equipment.

BRIEF DESCRIPTION OF THE INVENTION

The present invention may basically be described as a balanced spherical body wherein the mass is effectively distributed about the center of a thin uniform shell. This condition may be satisfied by the proper disposition of any components contained within the spherical outer shell. The sphere will thus be balanced and free to roll about its geometric center regardless of the location of the water line; i.e. the center of mass and the geometric center of the sphere are coincident. By adding a relatively small restoring or running weight to the bottom of the balanced sphere a righting moment (a torque tending to make the body float in the upright position) is supplied. The magnitude of the tuning weight in combination with the size and weight of the sphere determines the natural or tuned periodicity of oscillation of the sphere according to the relationship.

$$T = 2\pi \sqrt{\frac{W_s r}{g w_t}} \quad (1)$$

where:

T is the tuned period of oscillation of the sphere in seconds,
$W_s$ is the displacement of the sphere in pounds,
r is the radius of the sphere in feet,
$w_t$ is the magnitude of the tuning weight in pounds, and
g is the acceleration due to gravity in feet per second$^2$ Since the quantity $W_s r^2 / g$ is the moment of inertia of a spherical body, Equation 1 may be restated as $$T = 2\pi \sqrt{I/W_t r} \quad (2)$$

where I is the moment of inertia of the spherical body. To illustrate this relationship, a balanced buoy having a radius of three feet and displacing 3500 pounds has a moment of inertia of 980 pound feet/second$^2$ and requires a tuning weight of 13.8 pounds in order to have an oscillary period of 30 seconds.

The sphere will thus oscillate as a compound pendulum only when excited at its tuned frequency. By tuning the sphere to a period which is longer than that of the ocean waves the wave energy is prevented from being imparted to the sphere, and it will float in the upright position while following the wave contour in a substantially perfect manner.

OBJECTS OF THE INVENTION

It is thus a primary object of the present invention to provide a spherical floating body which is decoupled from the motion of the waves.

It is another object of the present invention to provide a spherical floating body which may be tuned to a preselected natural period of oscillation.

It is a further object of the present invention to provide an improved wave measuring buoy.

It is yet another object of the present invention to provide an improved wind measuring buoy.

It is still a further object of the present invention to provide an improved off-shore drilling platform.

These and other objects, features and advantages of the present invention will become more apparent from the detailed discussion considered in conjunction with the accompanying drawings. The scope of the invention will be indicated in the claims.

BRIEF DESCRIPTION OF THE DRAWINGS

FIGURE 1 is a schematic representation of the present invention;

FIGURE 2 is a diagram showing the forces acting on the present invention in operation;

FIGURE 3 illustrates the present invention as a wind measuring buoy;

FIGURE 4 is a schematic representation of the present invention in a moored embodiment.

DESCRIPTION OF THE PREFERRED EMBODIMENT

Figure 5:
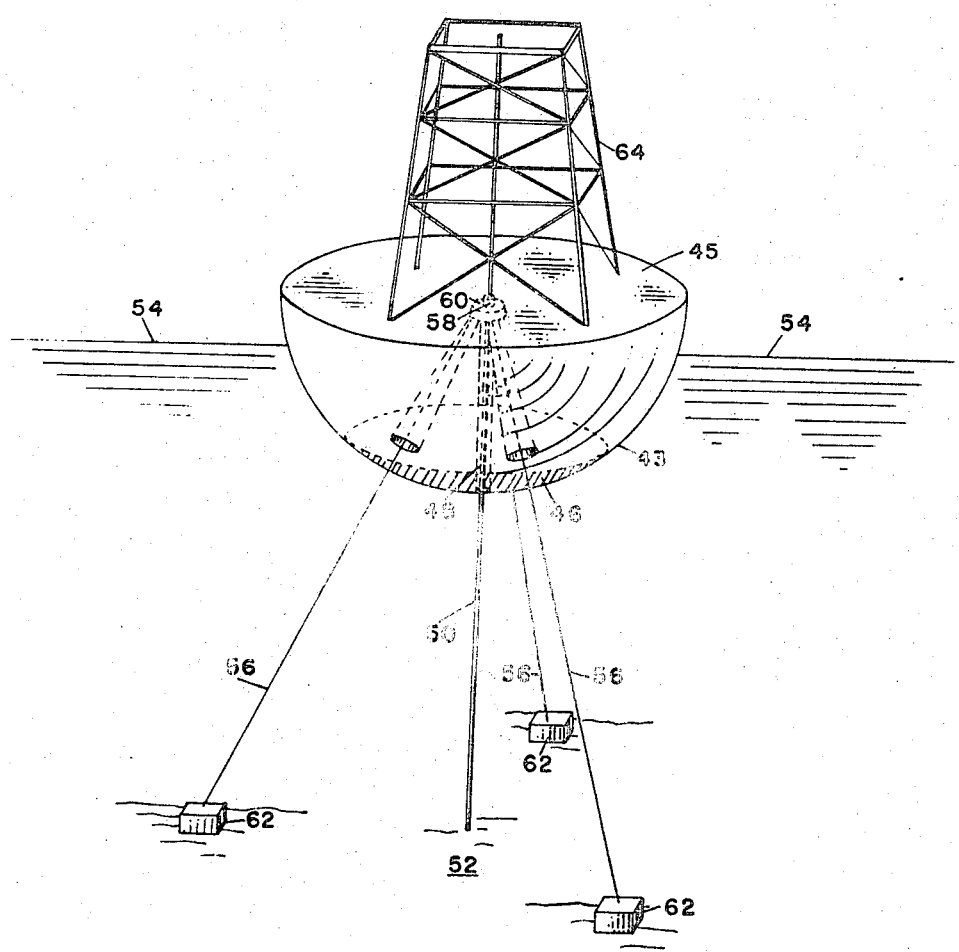
FIGURE 5 illustrates the present invention as an off-shore drilling patform.

Referring now to FIGURE 1, there is illustrated a schematic representation of the present invention. The invention comprises a spherical shell 10 within which instrumentation or other internal parts such as a signal transmitting means are disposed such that the effective mass 12 is located in the upper and lower portions of the shell 10. The center of mass of this assembly is thus coincident with the geometric center 18 of the sphere 10. A small restoring or tuning weight 14 is then located in the bottom of the sphere 10, and serves to lower the center of mass to a position 16 below the geometric center 18. Thus when the sphere is tilted or rolled about its geometric center 18 in any direction a righting moment is exerted which tends to keep the sphere in the vertical position. A transmitting antenna 20 may be affixed to the top of the sphere. The entire assembly is mechanically similar to a metronome, and will oscillate as a compound pendulum only when excited by energy having a period defined by Equation 2 above. The sphere is preferably tuned to a natural period of oscillation greater than about 27 seconds which is considerably longer than the periodicity spectrum of 2 to 15 seconds which includes substantially all ocean waves.

FIGURE 2 illustrates the condition as the tuned sphere floats on the face of a homogeneous; i.e. non-breaking wave 22. In order to excite oscillation of the tuned sphere 10, a force must be applied which displaces the system; i.e. other than through the axis of rotation of the body. This force is applied at the center of buoyancy 24 of the body, and in the present case the vector resultant can only be applied through the geometric center 18 of the sphere. The buoyancy 26 is up, the acceleration 28 is horizontal and the vector resultant 30 passes through the geometric center of the sphere. This condition will hold for all but breaking waves and results in no rolling moment being developed in the sphere. Thus it will float in the vertical position while following the contour of the wave.

The ocean surface following characteristics of the present invention makes it ideally suited for measuring waves by means of accelerometers placed inside a buoy constructed in accordance with the invention. Since such a buoy has no motion of its own, being "locked into" the mass of water which immediately surrounds it, it directly reflects the motion of that water; i.e. the sea state. The buoy follows the water mass horizontally as well as vertically and the use of orthogonally mounted accelerometers magnetically oriented by recognized means will provide data on the size, velocity and direction of a wave front.

As illustrated in FIGURE 3, the present invention also permits the measurement of wind velocity and direction from within the buoy. When the aerodynamic drag characteristics of the transmitting antenna 20 are known, the velocity of the wind 32 becomes a known function 33 of the angle of tilt 34 of the tuned sphere 10. For example a spherical buoy, half submerged in the water 35 and tuned to a period of 30 seconds will tilt at an angle of 14 degrees as a 10 knot wind passes an 8 foot antenna having an area of one square foot. The angle of tilt 34 may be measured by a pendulum or other suitable means and the wind direction may be determined by a magnetic compass, both of which instruments are located within the spherical shell of the buoy. Since the wind 32 constitutes a steady state force there will be no effect on the tuning of the buoy. It will be apparent that instrumentation for wind and wave measurement as well as a transmitter as discussed hereinabove may assume a wide variety of configurations and dispositions within the sphere 10. It is thus to be understood that such apparatus may make up the effective mass 12 of the sphere. It is further within the contemplation of the invention that such apparatus may in practice actually be the tuning weight.

Buoys constructed according to the present invention will be only temporarily affected by icing conditions. Ice accumulating on the antenna will eventually capsize the buoy, however, the water will melt the ice, the buoy will right itself, and the process will be repeated until the icing condition is over.

The present invention is contemplated primarily as a free floating buoy, however, as illustrated in FIGURE 4 the buoy may be moored if necessary provided the mooring line is attached to the geometric center 18 of the buoy 36. A cone 38 may be inserted into the bottom of the bouy 36 and a swiveling dogleg connecting link 40 attached at one of its ends 42 to the geometric center 18 of the buoy 36. The dogleg 40 must have full swivels 42 on both ends so that it is free to rotate by gravity to provide proper clearance. The angle of the mooring line 44 from the vertical may be increased to almost double the angle of the cone 38 by means of the dogleg connecting link 40. Other possible mooring methods would include for example a double gimbal assembly outside the buoy.

It will be apparent that the theory of the present invention is not limited to any maximum or minimum size spherical body. A practical lower limit is determined primarily by the precision with which very small tuning weights may be disposed in the bottom of the sphere and by the unbalancing effects of water drops clinging to the external surface of the body. On the other hand the tuning of the sphere becomes less effected by small errors in balance as the scale of the invention is increased. For this reason the present invention permits the construction of large scale tuned floating bodies which are of sufficient size to accomodate large apparatus such as an offshore oil drilling rig. FIGURE 5 illustrates such an embodiment of the present invention.

A portion of a spherical shell 43 having a flat upper surface 45 will exhibit the same mechanical characteristics as the complete spherical body when tuned according to the present invention. The tuning weight 46 may be either a permanent mass placed in the body during the construction of the drilling platform or may be in the form of mud pumped into a tank after the platform supporting the drilling equipment 64 has been towed into place. A hole 48 is provided to allow the vertical passage of a drill 50 through the center of the body 43 to the ocean floor 52. The surface 45 of the platform is substantially above the surface 54 of the water to prevent washover by the largest expected waves. The platform may be moored in place providing the mooring lines 56 are effectively attached at the geometric center 58 of the body 42, such as by a collar 60 placed around the drill passage 48. The lower ends of a plurality of mooring lines 56 may be attached to a plurality of anchors 62 placed on the ocean floor 52. An alternative method of maintaining the drilling platform in place would be dynamic positioning whereby a plurality of screws apply forces through the geometric center of the body such that any horizontal movement of the waves is negated.

It will thus be seen that the objects set forth above, among those made apparent from the preceeding description, are efficiently attained and, since certain changes may be made in the above construction without departing from the scope of the invention, it is intended that all matter contained in the above description or shown in the accompanying drawings shall be interpreted as illustrative and not in a limiting sense.

Having described what is new and novel and desired to secure by Letters Patent, what is claimed is:

1. A tuned floating body, comprising
a spherical shell, and
a tuning weight,
said spherical shell having its mass distributed such that the center of mass and geometric center thereof are coincident,
said tuning weight being disposed at the bottom of said spherical shell
to provide a righting moment whereby said body is tuned to a preselected natural period of oscillation, and
having a magnitude $W_t$ which is related to the radius and moment of inertia of said body by the relationship $$W_t = \frac{4\pi^2 I}{T^2 r}$$

where:

I is the moment of inertia about a horizontal axis of said spherical shell, r is the radius of said spherical shell, and T is the natural period of oscillation of said tuned body.

2. Apparatus as described in claim 1 wherein the magnitude of said tuning weight is such that said natural period of oscillation of said body is greater than the period of waves in the medium in which said body floats, whereby said body experiences substantially no rolling moment as a result of wave energy being imparted thereto.

3. A tuned floating body, comprising a portion of a spherical outer shell having a flat surface provided on the top thereof, and a tuning weight, said shell having its mass distributed such that the center of mass thereof is coincident with the geometric center thereof, said tuning weight being disposed at the bottom of said outer shell to provide a righting moment whereby said body is tuned to a preselected natural period of oscillation, and having a magnitude $W_t$ which is related to the radius and moment of inertia of said body by the relationship $$W_t = \frac{4\pi^2 I}{T^2 r}$$

where:

I is the moment of inertia about a horizontal axis of said outer shell, r is the radius of said spherical portion of said outer shell, and T is the natural period of oscillation of said tuned body.

4. Apparatus as described in claim 3 wherein the magnitude of said tuning weight is such that said natural period of oscillation and said body is greater than the period of waves in the medium in which said body floats, whereby said body experiences substantially no rolling moment as a result of wave energery being imparted thereto.

5. Apparatus as described in claim 2 further including a mooring means comprising a cone inserted into the bottom of said spherical shell such that the apex of said cone is disposed at said geometric center of said spherical shell, a swiveling dogleg connecting link attached by a first end thereof to the geometric center of said body, a mooring line attached to a second end of said dogleg connecting link whereby said tuned floating body may be moored without said mooring means having an effect on the tuned characteristics of said body.

6. Apparatus as described in claim 4 further including offshore drilling apparatus disposed upon said flat top surface of said shell; and said flat surface being substantially above the level of the medium in which said body floats.

References Cited

UNITED STATES PATENTS

| | | | |
|---|---|---|---|
| 996,458 | 6/1911 | Coleman. | |
| 1,800,811 | 4/1931 | Wolfe | 273—58 |
| 1,865,095 | 6/1932 | Frei | 272—1 |
| 2,411,202 | 11/1946 | Gardner | 9—8 |
| 2,911,658 | 11/1959 | Stanley | 9—8 |
| 3,191,202 | 6/1965 | Handler | 9—8 |
| 3,275,976 | 9/1966 | Farmer | 9—8 X |

TRYGVE M. BLIX, Primary Examiner

U.S. Cl. X.R.

114—121